US012671156B2

(12) United States Patent
Kufa et al.

(10) Patent No.: US 12,671,156 B2
(45) Date of Patent: Jun. 30, 2026

(54) PIM ROBUST PHASING LINE SHORT CIRCUIT DESIGN

(71) Applicant: Outdoor Wireless Networks LLC, Claremont, NC (US)

(72) Inventors: Martin Kufa, Chlumec nad Cidlinou (CZ); Jirí Kasík, Pardubice (CZ); Erik Madle, Hradec Kralove (CZ); Roman Hofman, Prelouc (CZ); Libor Poláček, Chrudim (CZ)

(73) Assignee: Outdoor Wireless Networks LLC, Richardson, TX (US)

(*) Notice: Subject to any disclaimer, the term of this patent is extended or adjusted under 35 U.S.C. 154(b) by 171 days.

(21) Appl. No.: 18/629,591

(22) Filed: Apr. 8, 2024

(65) Prior Publication Data

US 2024/0363988 A1 Oct. 31, 2024

Related U.S. Application Data

(60) Provisional application No. 63/498,782, filed on Apr. 27, 2023.

(51) Int. Cl.
*H01P 1/18* (2006.01)
*H01P 1/213* (2006.01)

(52) U.S. Cl.
CPC .............. *H01P 1/184* (2013.01); *H01P 1/213* (2013.01)

(58) Field of Classification Search
CPC ........... H01P 1/184; H01P 1/213; H01P 1/203
USPC ....... 333/161, 202, 203, 206, 207, 222, 223, 333/224, 225, 226
See application file for complete search history.

(56) References Cited

U.S. PATENT DOCUMENTS 11,289,785 B2 * 3/2022 Potocná ............. H03H 9/02653

* cited by examiner

*Primary Examiner* — Jorge L Salazar, Jr.
(74) *Attorney, Agent, or Firm* — Fogg & Powers LLC

(57) ABSTRACT

Systems for a PIM robust phasing line short circuit design is described herein. In certain implementations, a system includes a phasing line within a groove. Also, the system includes a shorting component having a mating surface that couples to a first surface of the phasing line and a surface opposite the mating surface that couples to a first interior surface of the groove. Further, the system includes a securing component configured to couple to a second surface of the phasing line opposite the first surface. Moreover, the system includes a pressure application component that applies pressure against a second interior surface of the groove opposite the first interior surface and against the securing component, the pressure being applied in opposite directions, wherein the pressure applied causes the securing component to press the phasing line into the mating surface, and the shorting component to press against the first interior surface.

20 Claims, 6 Drawing Sheets

PIM ROBUST PHASING LINE SHORT CIRCUIT DESIGN

CROSS-REFERENCE TO RELATED APPLICATIONS

This application claims priority to U.S. Provisional Application No. 63/498,782, filed on Apr. 27, 2023, and titled "PIM ROBUST PHASING LINE SHORT CIRCUIT DESIGN," the contents of which are incorporated by reference herein in their entirety.

BACKGROUND

Resonant cavity filters, particularly resonant cavity filters with coaxial resonators, are used widely in wireless communications systems, such as cellular and in-building distributed antenna systems. For example, resonant cavity filters are commonly used to implement low-pass filters, high-pass filters, band-stop filters, band-pass filters, duplexers, diplexers, and the like. Some filters/duplexers may operate on more than one band. Within these multiband filters, phasing lines match the different bands. Often, short circuits ground the phasing lines as part of the RF tuning within the filter design.

SUMMARY

Systems for a PIM robust phasing line short circuit design are described herein. In certain implementations, a system includes a phasing line within a groove. Also, the system includes a shorting component having a mating surface that couples to a first surface of the phasing line and a surface opposite the mating surface that couples to a first interior surface of the groove. Further, the system includes a securing component configured to couple to a second surface of the phasing line, wherein the second surface is opposite the first surface. Moreover, the system includes a pressure application component configured to apply pressure against a second interior surface of the groove opposite the first interior surface and against the securing component, the pressure being applied in opposite directions, wherein the pressure applied to the securing component causes the securing component to press the phasing line into the mating surface of the shorting component, and the shorting component to press against the first interior surface of the groove.

BRIEF DESCRIPTIONS OF THE DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Figure 1A:
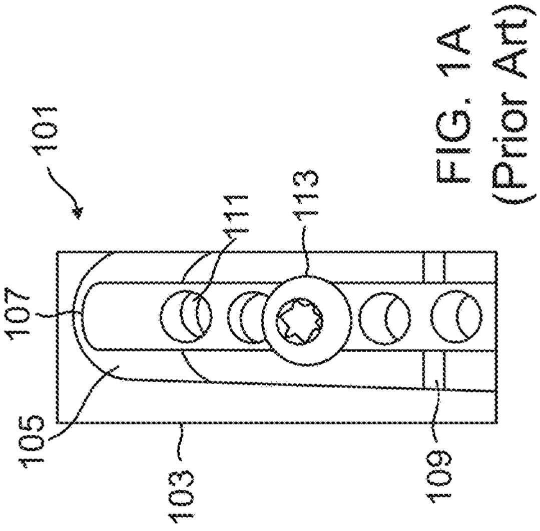
FIG. 1A (Prior Art)
FIGS. 1A-1D illustrate various aspects of a typical implementation for shorting a phasing line within a groove.

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

The present disclosure describes systems and methods for a passive intermodulation (PIM) robust phasing line short circuit design. The phasing line short circuit design uses a flat phasing line that is secured within a groove between two sliding blocks. The two sliding blocks can continuously move along the length of the flat phasing line before being secured by pressure applied by a fixation screw. When the fixation screw secures the sliding blocks, the front edge of the sliding blocks contacts an internal surface of the groove with homogenous pressure. As such, the uniform face and homogenous contacts reduce the PIM by applying substantially uniform pressure to the interior surface of the groove.

In some communication systems, filters pass certain frequency bands while attenuating other frequency bands, separating desired signals from unwanted interference or noise. In some systems, the filters may be cavity filters that include a resonant cavity made from an electronically conductive material, where signals resonate within the cavity at specific frequencies or ranges of frequencies. Frequently, adjustable components within the resonant cavity can be moved to tune the resonant frequencies of the cavity. As such, the filters may be commonly used to separate desired signals from unwanted interference or noise.

Further, communication systems may include duplexers, which allow the simultaneous transmission and reception of signals using a single antenna. Duplexers function by separating transmit and receive frequency bands, directing signals to appropriate transmitter and receiver circuits while reducing interference between transmitted and received signals. Often, duplexers include cavity filters to achieve the desired frequency separation between the transmitted and received signals. For example, cavity filters may be tuned to the desired transmit and receive frequency bands to reduce interference between the transmitted and received signals.

In some communication systems, duplexers or filters may be coupled by a system of transmission lines to provide a multiband filter. Some of the transmission lines may be referred to as phasing lines. The lengths of the phasing lines may be designed to impedance match a duplexer or filter in its passband(s). To diminish insertion loss, the transmission lines may be formed within a conductive block in a manner similar to the resonant cavities described above. Often, short circuits ground the phasing lines as part of the RF tuning within the filter design.

When a communication system includes short circuits to ground the phasing lines, an adjustable conductive component may attach to a phasing line and provide a grounding path between the phasing line and a surface of the groove. Typically, the adjustable conductive component is secured to the phasing line and, in turn, secured to a surface of the groove at a particular location by a securing device to fix the resonant response of the phasing line. However, when the adjustable conductive component is secured, the adjustable conductive component may not uniformly contact the phasing line or the surface of the groove. Also, the face of the adjustable conductive component may be distorted by the force exerted on the adjustable conductive component by a securing device. The lack of uniform contact is often a source of PIM distortion, creating unwanted products or harmonics that can interfere with the normal operation of a communication system.

Figure 1B:
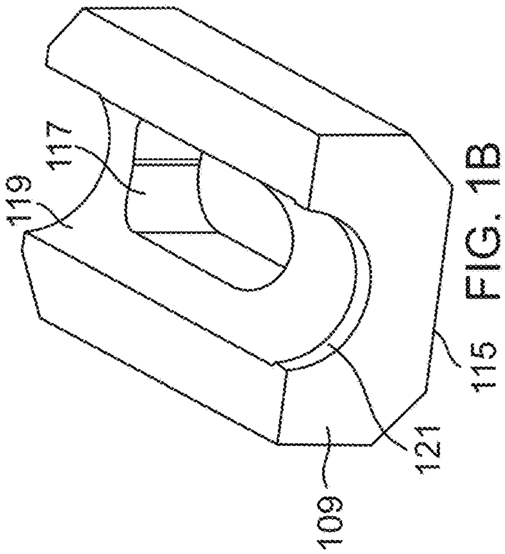
FIG. 1B (Prior Art)
Figure 1C:
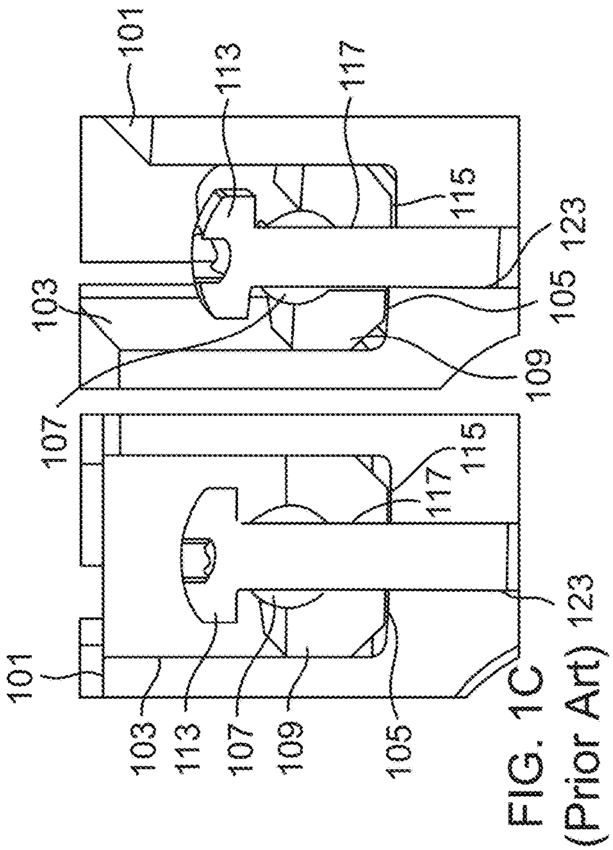
FIG. 1C (Prior Art)
Figure 1D:
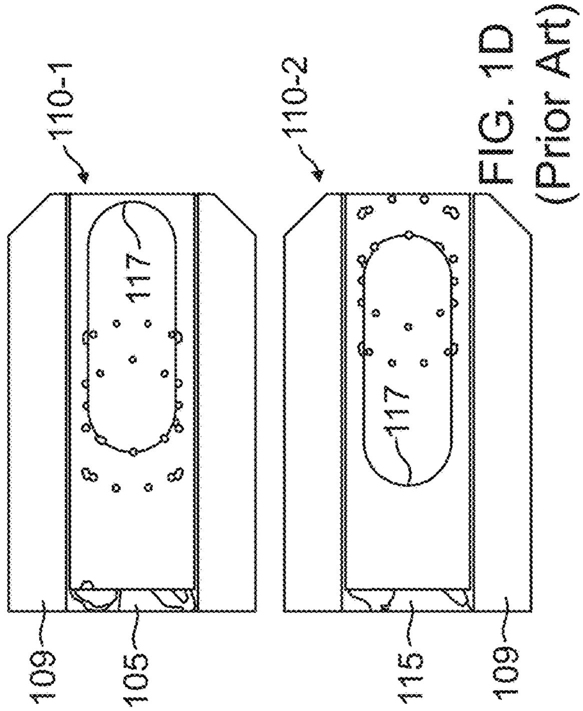
FIG. 1D (Prior Art)

FIGS. 1A-1D illustrates various aspects of a typical implementation for shorting a phasing line within a groove. For example, FIG. 1A illustrates a top view of a shorted phasing line within a groove. FIG. 1B illustrates an adjustable conductive component. FIG. 1C shows cross-sectional views of the shorted phasing line within a groove. FIG. 1D shows the pressure applied to an adjustable conductive component when secured to a phasing line in the outer positions.

As illustrated in FIG. 1A, a phasing line 107 is secured by a securing mechanism 113 (such as a screw, bolt, or other securing mechanism) to an adjustable conductive component 109 that conductively couples the phasing line 107 to a bottom surface 105 of a groove 103 within a conductive body 101 of a device, such as a filter, duplexer, or other component having an interior cavity. As illustrated, the phasing line 107 is rounded and has a series of holes 111. The series of holes 111 allow the adjustable conductive component 109 to be secured at different locations along the phasing line 107 to tune the impedance match a duplexer or filter in its passband(s) by groove 103. To secure the adjustable conductive component 109 at a location along the phasing line 107, the securing mechanism 113 extends through one of the holes 111, through a slot in the adjustable conductive component 109, and into a hole in the bottom surface 105 that corresponds with the position of the hole 111 in the phasing line 107. When the securing mechanism 113 is tightened, the securing mechanism 113 exerts pressure that pushes the phasing line 107 into the adjustable conductive component 109 and the adjustable conductive component 109 against the bottom surface 105 of the groove 103.

As illustrated in FIG. 1B, the adjustable conductive component 109 includes a groove 119 into which a phasing line 107 may rest within the adjustable conductive component 109. Within the groove 119, the adjustable conductive component 109 includes a slot 117. As mentioned, a securing mechanism 113 may extend through the slot 117 into the bottom surface 105 of the groove 103. The slot 117 allows the adjustable conductive component 109 to move laterally along the length of the groove 103 over a range. Further, the adjustable conductive component 109 may include a front lower edge 115 and a front upper edge 121. When secured, the front lower edge 115 is pressed against the bottom surface 105, and the front upper edge 121 presses against the phasing line 107 to provide sufficient contact against the phasing line 107 in the case of the front upper edge 121 and the bottom surface 105 in the case of the front lower edge 115.

As illustrated in FIG. 1C, the securing mechanism 113 extends through a hole 111 in the phasing line 107 and the adjustable conductive component 109 into a hole 123 in the conductive body 101. For example, when the securing mechanism 113 is a screw, the securing mechanism 113 may engage with threads in the conductive body 101 that apply pressure to the phasing line 107 and the adjustable conductive component 109 between the head of the securing mechanism 113 and the conductive body 101. The applied pressure causes the phasing line 107 to press into the adjustable conductive component 109, where the adjustable conductive component 109 is, in turn, pressed into the bottom surface 105 of the groove 103, shorting the phasing line 107.

As shown, the adjustable conductive component 109 may have a front lower edge 115 that presses into the bottom surface 105 of the groove 103. As the front lower edge 115 and front upper edge 121 are connected to a front face of the adjustable conductive component 109, the quality of pressure may affect the contact between the front lower edge 115 and the bottom surface 105 and the front upper edge 121 and the phasing line 107 and quality of the short-circuiting of the phasing line 107 through the adjustable conductive component 109 to the bottom surface 105. For example, if at least one of the contact areas 115 and 121 between the phasing line 107 and the bottom surface 105 through the adjustable conductive component 109 is not uniform, the insufficient quality of pressure could be an unwanted potential source of passive intermodulation (PIM).

FIG. 1D illustrates a down-top view of multiple adjustable conductive components 109 secured within the groove 103 and the pressure applied to the adjustable conductive components 109 when secured by a securing mechanism 113 at different locations 110. When comparing the pressure applied to the front lower edge 115 of the adjustable conductive component 109 by the bottom surface 105 of the groove 103, the pressure applied is not consistent and changes based on the location of where the force is applied by the securing mechanism 113 to the adjustable conductive component 109 as it extends through the slot 117. For example, in a first location 110-1, the securing mechanism 113 may secure the adjustable conductive component 109 at a position within the slot 117 closer to the front lower edge 115. Conversely, in a second location 110-2, the securing mechanism 113 may secure the adjustable conductive component 109 at a position within the slot 117 that is farther from the front lower edge 115. The pressure applied to the front lower edge 115 by the bottom surface 105 in the first location 110-1 differs from the pressure applied to the front lower edge 115 by the bottom surface 105 in the second location 110-2. The differences in pressure application at the different locations 110 by different adjustable conductive components 109 may cause inconsistent pressure, which introduces PIM. Thus, the typical device for shorting a phasing line 107 may introduce PIM, causing system degradation. A similar potential PIM issue is between the phasing line 107 and the front upper edge 121.

Figure 2:
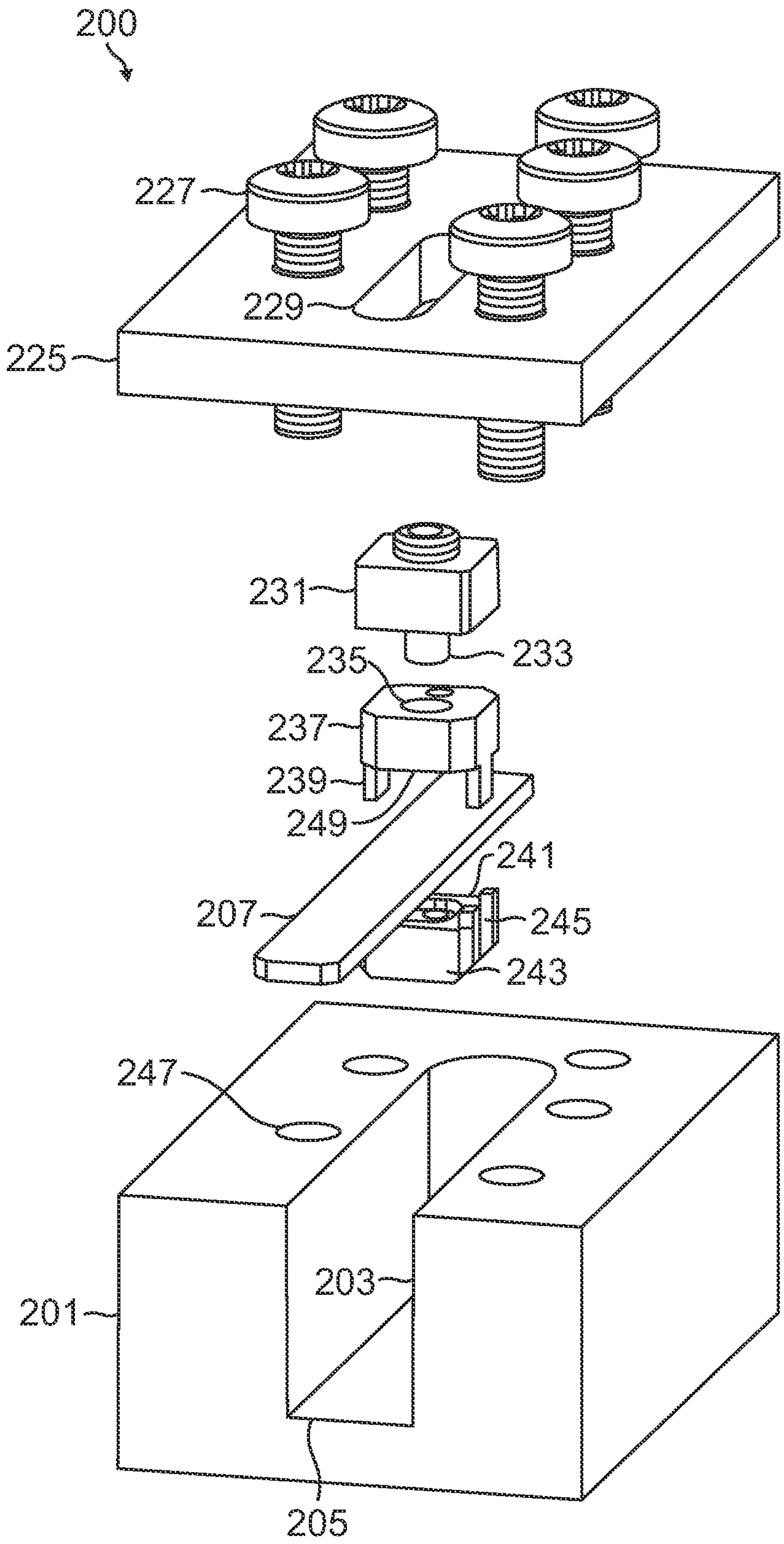
FIG. 2 is an exploded diagram of a PIM robust short circuit design according to an aspect of the present disclosure.

FIG. 2 is an exploded diagram of a PIM robust short circuit design 200 for short-circuiting a phasing line 207 within a groove 203. As shown, the groove 203 may be similar to the groove 103 described above in FIGS. 1A-1D. For example, the groove 103 may be a cavity formed within a conductive body 201. The phasing line 207 may perform the same function as the phasing line 107 in FIGS. 1A-ID, but the phasing line 207 may be shaped differently. In particular, the phasing line 207 may be a flattened rectangular phasing line in contrast to the rounded phasing line 107 shown in FIGS. 1A-1D.

As shown, the short circuit design 200 includes a series of components that function together with surfaces of the conductive body 201 and associated cover 225 to securely short the phasing line 207 at a desired location within the groove 203. In particular, the components may include a shorting component 243, a phasing line securing component 237, and a pressure application component 231 having a moveable mechanism 233 formed therein. As the phasing line 207 is flat and the components of the short circuit design 200 are shorter with the location of the moveable mechanism 233 consistently in the middle of the short circuit design 200 (in contrast to the previous design described in FIG. 1A-1D), the components of the short circuit design 200 can apply uniform pressure between the phasing line 207 and the shorting component 243 as well as between the shorting component 243 and the bottom surface 205 of the groove 203. As the components enable the uniform application of pressure, the short circuit design 200 can provide a more stable and precise short circuit from the phasing line 207 through shorting component 243 to the bottom surface 205 of the groove 203, reducing PIM.

As mentioned, the short circuit design 200 includes a shorting component 243. The shorting component 243, as used herein, refers to a component made from a conductive material that provides an electrical connection between the phasing line 207 and the bottom surface 205. In contrast to the adjustable conductive component 109 described above in FIGS. 1A-1D, the shorting component 243 does not have a hole that extends through the shorting component 243 for permitting a securing mechanism 113 to extend through the shorting component 243 into a hole in the bottom surface 205. As such, the shorting component 243 may be positioned at any location along a particular length of the groove 203 compared to a particular location around a predrilled hole in the bottom surface 205.

In certain embodiments, the shorting component 243 may have a phasing line surface 241 designed to mate against a flat phasing line 207. For example, the shorting component 243 may have a rectangular groove that extends longitudinally along a length of the shorting component 243, where the phasing line surface 241 is the surface of the rectangular groove facing the wide surface of the flat phasing line 207. The width of the rectangular groove may be substantially equal to or slightly wider than the width of the flat phasing line 207. The rectangular groove may help position the shorting component 243 with respect to the phasing line 207, which may help secure the phasing line 207 at a desired location within the groove 203. In further implementations, the shorting component 243 may include slots 245 for mating with notches 239 of a phasing line securing component 237. The slots 245 and notches 239 may aid in aligning the position of the shorting component 243 with the position of the phasing line securing component 237. Alternatively, while not shown, the shorting component 243 may include notches that mate with slots in the phasing line securing component 237.

In certain embodiments, the phasing line securing component 237 is placed on a side of the phasing line 207 that is opposite the side of the phasing line 207 facing the phasing line surface 241 of the shorting component 243. Like the phasing line surface 241 on the shorting component 243, the phasing line securing component 237 may include a phasing line surface 249 designed to mate against the flat phasing line 207. For example, the phasing line securing component 237 may have a rectangular groove that extends longitudinally along a length of the phasing line securing component 237 that corresponds with the length of the phasing line 207, where the phasing line surface 249 is the surface of the rectangular groove facing the wide surface of the phasing line 207. The width of the rectangular groove may also be substantially equal to or slightly wider than the width of the phasing line 207, and the rectangular groove helps position the phasing line securing component 237 with respect to the phasing line 207, which helps secure the phasing line 207 at a desired location within the groove 203.

In additional embodiments, the phasing line securing component 237 may have a pressure reception surface 235. The pressure reception surface 235 is a surface of the phasing line securing component 237 that is designed for receiving pressure that presses the phasing line securing component 237 toward the phasing line 207. For example, as pressure is applied to the pressure reception surface 235, the phasing line surface 249 of the phasing line securing component 237, in turn, applies pressure to the phasing line 207, which in turn applies pressure to the phasing line surface 241 of the shorting component 243, which in turn applies pressure to the bottom surface 205 of the groove 203. As such, if the pressure applied to the pressure reception surface 235 is sufficient, the phasing line securing component 237 and the shorting component 243 apply pressure to opposite sides of the phasing line 207, and the shorting component 243 applies pressure to the bottom surface 205 of the groove 203 while securing the location of the shorting component 243 within the groove 203. Further, because the slots 245 of the shorting component 243 receive the notches 239 of the phasing line securing component 237, the location of the phasing line securing component 237 is also secured within the groove 203. Further, as the phasing line 207 is rectangular and the phasing line surface 241 and the phasing line surface 249 are flat surfaces, the pressure applied by the phasing line securing component 237 and the shorting component 243 to the phasing line 207 and surfaces of the groove 203 is substantially uniform, reducing the incidence of PIM within the groove 203.

In certain embodiments, to apply pressure to the pressure reception surface 235 of the phasing line securing component 237, the short circuit design 200 includes a pressure application component 231. The pressure application component 231, as used herein, refers to any component that can stabilize a moveable mechanism 233 with respect to a surface of the conductive body 201 or a cover 225 of the conductive body 201. For example, the pressure application component 231 may be a block, and the moveable mechanism 233 may be a screw-driven post that extends through the block. In some implementations, an end of the screw-driven post may extend to a receiving hole in the pressure reception surface 235. When the pressure application component 231 is a block, the block may be fixed at a position within the groove 203 such that a surface of the moveable mechanism 233 is in contact with the pressure reception surface 235 of the phasing line securing component 237. As the moveable mechanism 233 may be screw-driven, as the moveable mechanism 233 is turned, the moveable mechanism 233 may move through a hole in the pressure application component 231. As such, the moveable mechanism 233 may be turned to apply more or less pressure to the pressure reception surface 235 depending on the direction that the moveable mechanism 233 is turned. As such, the moveable mechanism 233 may be turned sufficiently to secure the location of the phasing line securing component 237 and the shorting component 243 within the groove 203.

In further embodiments, the pressure application component 231 may use a cover 225 for the groove 203 as a brace for applying pressure to the phasing line securing component 237 through the moveable mechanism 233. For example, a surface of the pressure application component 231 may press against an interior surface of the cover 225 that is secured to the conductive body 201 through a series of bolts 227 (or other securing mechanism, i.e., latches, etc.) inserted into corresponding holes 247 in the conductive body 201. As the moveable mechanism 233 turns, the moveable mechanism 233 may attempt to push the pressure application component 231 away from the phasing line securing component 237. As the pressure application component 231 braces against an interior surface of the cover 225, the moveable mechanism 233 will push the phasing line securing component 237, phasing line 207, and shorting component 243 against the bottom surface 205 of the groove 203, securing the location of the phasing line securing component 237 and shorting component 243 within the groove 203. The surface of the pressure application component 231 may also press against an interior surface of the groove 203 of the conductive body 201 or another independent part secured to the conductive body 201.

In certain embodiments, the cover 225 may include an adjustment slot 229. The adjustment slot 229 may be a slot in the cover 225 that allows the insertion of a tool through the cover 225 for adjusting the position of the shorting component 243, phasing line securing component 237, and pressure application component 231 along the length of the phasing line 207 and also for turning the moveable mechanism 233 to secure the position of the phasing line securing component 237 and shorting component 243 within the groove 203. For example, before tightening the pressure application component 231 against a secured cover 225, the pressure application component 231, phasing line securing component 237, and shorting component 243 may be moved to the desired location along the phasing line 207 under the adjustment slot 229. A screwdriver, hex wrench, or the like may be inserted through the adjustment slot 229 to turn the moveable mechanism 233. As the moveable mechanism 233 turns, the distance between the pressure application component 231 and the phasing line securing component 237 increases. When the pressure application component 231 comes into contact with the interior surface of the cover 225 and the shorting component 243 comes into contact with the bottom surface 205, further turning of the moveable mechanism 233 will increase the pressure applied by the pressure application component 231 against the interior surface of the cover 225 and the pressure applied by the phasing line securing component 237 through the phasing line 207 and the shorting component 243 against the bottom surface 205. The moveable mechanism 233 may be turned until sufficient pressure is applied to lock the positions of the various components of the short circuit design 200 in relation to one another.

Figure 3:
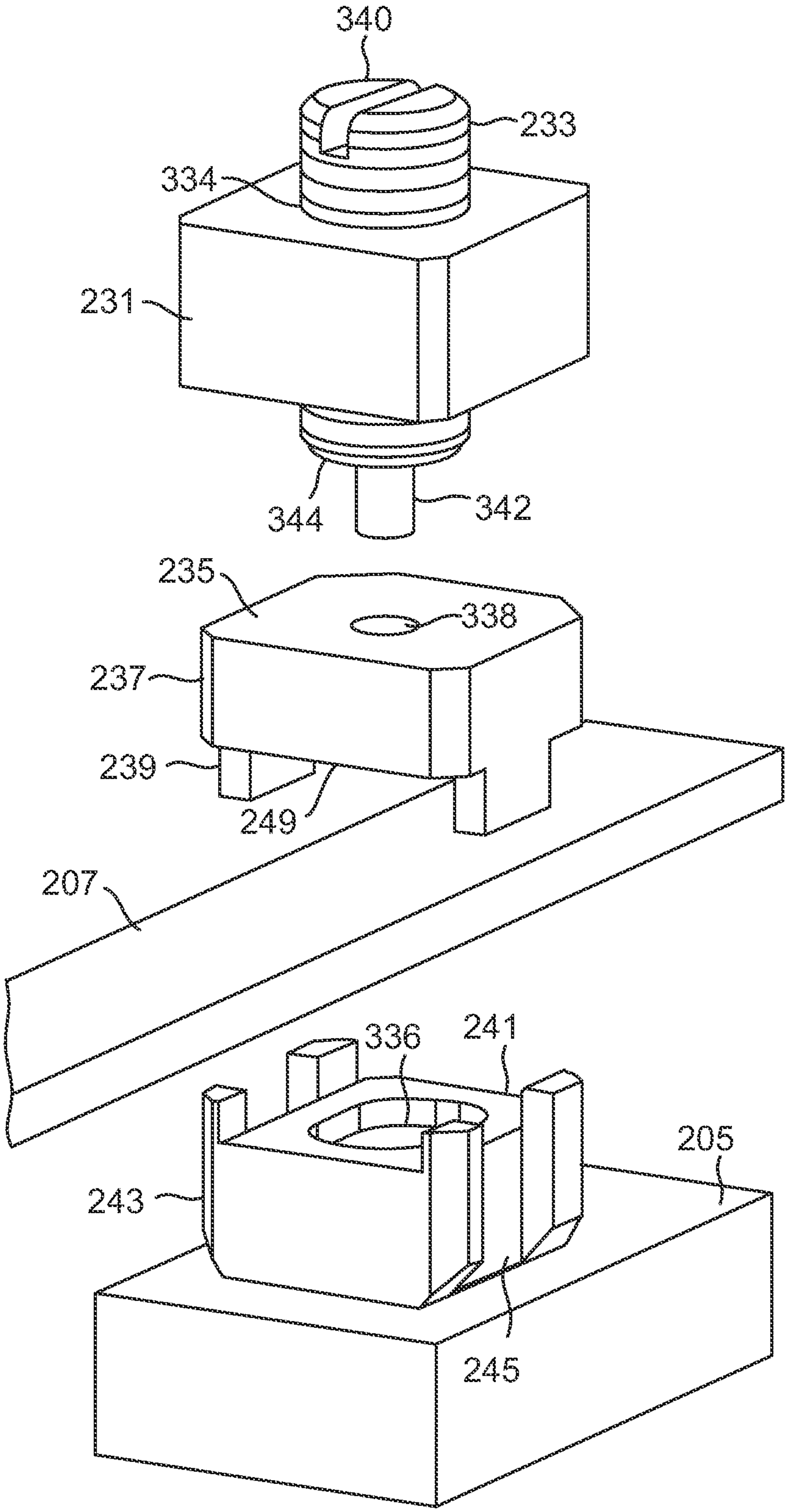
FIG. 3 is an exploded diagram of the components of a PIM robust short circuit design according to an aspect of the present disclosure.
Figure 4:
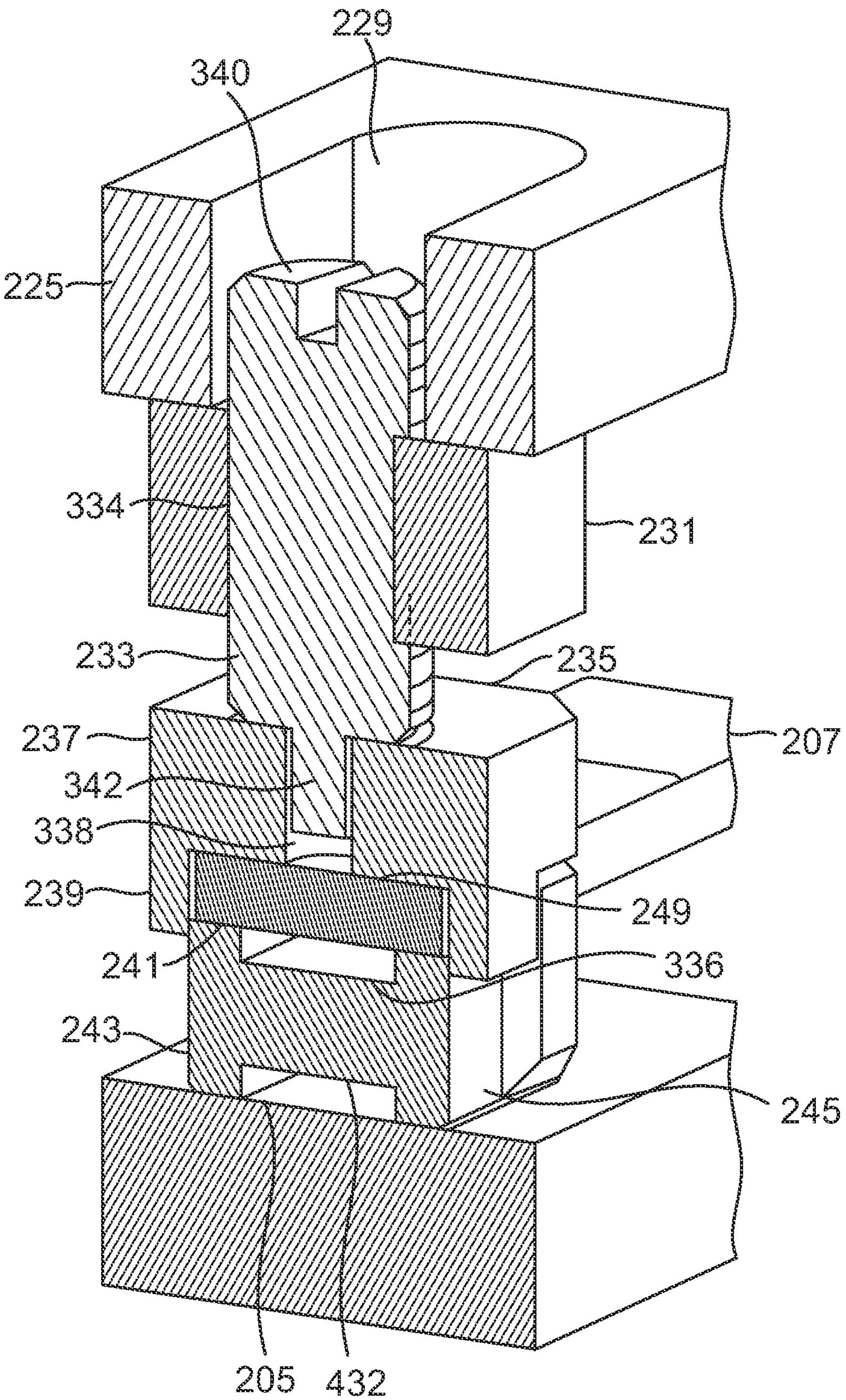
FIG. 4 is a cutaway diagram illustrating the components of a PIM robust short circuit design according to an aspect of the present disclosure.
Figure 5:
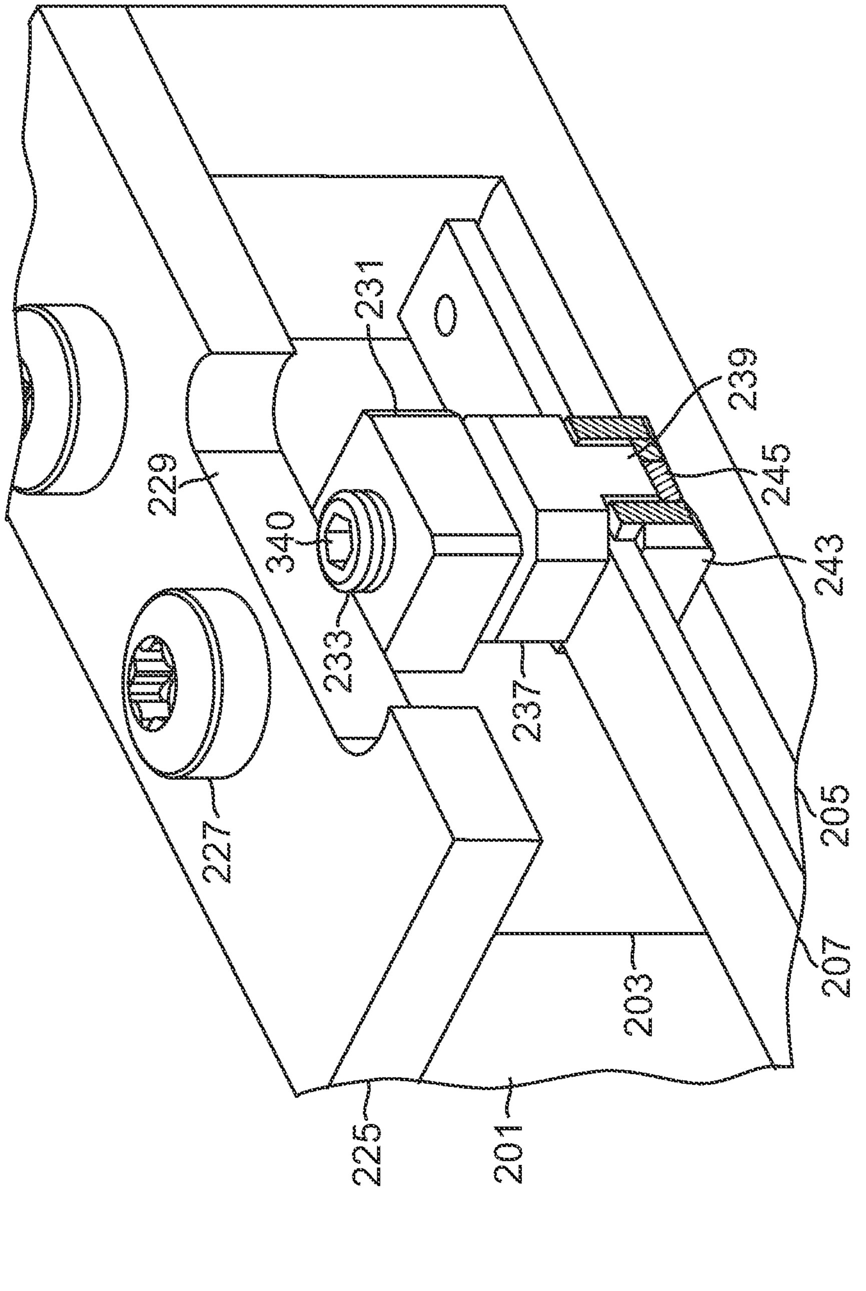
FIG. 5 is a diagram illustrating the components installed within a groove of a PIM robust short circuit design according to an aspect of the present disclosure.

FIGS. 3-5 illustrate different views of the components used to secure the shorting component 243 for a phasing line 207 against a bottom surface 205 of the groove 203. FIG. 3 is an exploded diagram of the components used to secure the shorting component 243 for a phasing line 207 against a bottom surface 205 of a groove 203, absent the structures of the conductive body 201 and cover 225. FIG. 4 is a cutaway diagram illustrating the components installed between the bottom surface 205 of the groove 203 and an interior surface of the cover 225. FIG. 5 is a diagram illustrating the components installed within a groove 203 with the conductive body 201 and cover 225 cutaway. As illustrated, FIGS. 3-5 illustrate an embodiment for the components that include the pressure application component 231, phasing line securing component 237, and the shorting component 243, which function similarly as described above in FIG. 2.

In some embodiments, the pressure application component 231 may include a through-hole 334. The through-hole may be threaded, where the threads provide a secure and adjustable connection for threads on the moveable mechanism 233, which is insertable into the through-hole 334. The threads inside the hole create a helical groove that matches the threads on the moveable mechanism 233. When the moveable mechanism 233 is inserted into the through-hole 334, the threads on the moveable mechanism 233 engage with the threads in the through-hole 334, creating a tight and stable connection. The threaded through-hole 334 allows for adjusting the position of the moveable mechanism 233 to a desired position for the pressure application component while still providing a secure and adjustable connection that can withstand the forces and stresses on it.

One surface of the moveable mechanism 233 may include a torque transmitter 340. The torque transmitter 340 may include a flattened surface orthogonal to a threaded cylindrical surface of the moveable mechanism 233. In some implementations, the flattened surface of the torque transmitter 340 may be the same diameter as the threaded cylinder of the moveable mechanism 233. The flattened surface may also include a torque reception feature for receiving an applied torque, which can be generated using various tools, such as a wrench, socket, screwdriver, and the like. The torque reception feature may be one of several shapes, including hexagonal, square, slots, etc. Further, the torque transmitter 340 may be accessible through an adjustment slot 229.

In an additional embodiment, the moveable mechanism 233 may include a pressure application surface 344 on an opposite side of the torque transmitter 340 on the moveable mechanism 233. As discussed above in connection with FIG. 2, the pressure application surface 344 may come into contact with a pressure reception surface 235 on the phasing line securing component 237 to apply pressure to the phasing line securing component 237. Accordingly, the pressure applied by the moveable mechanism 233 is adjustable as the moveable mechanism 233 moves through the through-hole 334 of the pressure application component 231 when the position of the pressure application component 231 is fixed in relation to an encapsulating conductive body 201 and cover 225 by abutting against an interior surface of the cover 225 as discussed above in FIG. 2.

In further embodiments, an alignment pin 342 may extend from the pressure application surface 344 for reception by an alignment hole 338 formed on the pressure reception surface 235 of the phasing line securing component 237. In particular, inserting the alignment pin 342 into the alignment hole 338 may align the position of the phasing line securing component 237 with the position of the pressure application component 231. Additionally, by aligning the phasing line securing component 237 with the position of the pressure application component 231, the pressure can be applied by the pressure application surface 344 at the same location on the pressure reception surface 235. By applying pressure at the same location on the phasing line securing component 237, phasing lines 207 can be shorted uniformly and deterministically, allowing for more accurate design implementations and reducing PIM effects.

Further, the notches 239 of the phasing line securing component 237 and engagement of the notches 239 with the slots 245 of the shorting component 243 are described above with respect to FIG. 2. Additionally, the engagement of the phasing line surface 249 with the phasing line 207 is described above in FIG. 2. Further, the phasing line surface 241 also engages with the phasing line 207, as described above in FIG. 2. However, in some implementations, the phasing line surface 241 may include a gap 336. The gap 336 may be located in the middle of the phasing line surface 241, which causes the edges of the phasing line surface 241 to engage with a surface of the phasing line 207. As the edges around the gap 336 engage with the surface of the phasing line 207, the phasing line 207 applies more predictable pressure to the shorting component 243, which in turn applies more predictable pressure to the bottom surface 205, leading to a reduction in PIM. Similarly, as illustrated in FIG. 4, the surface of the shorting component 243 that engages the bottom surface 205 of the groove 203 may also have a gap 432 that functions similarly to the gap 336 to increase the predictability of the applied pressure. Also, as the components can be secured without extending a securing mechanism through predefined holes in the phasing line 207 or the conductive body 201, the components can be secured in the same relative manner along a continuous length of the phasing line 207, contributing to the operable predictability of the components and more stable PIM.

Figure 6:
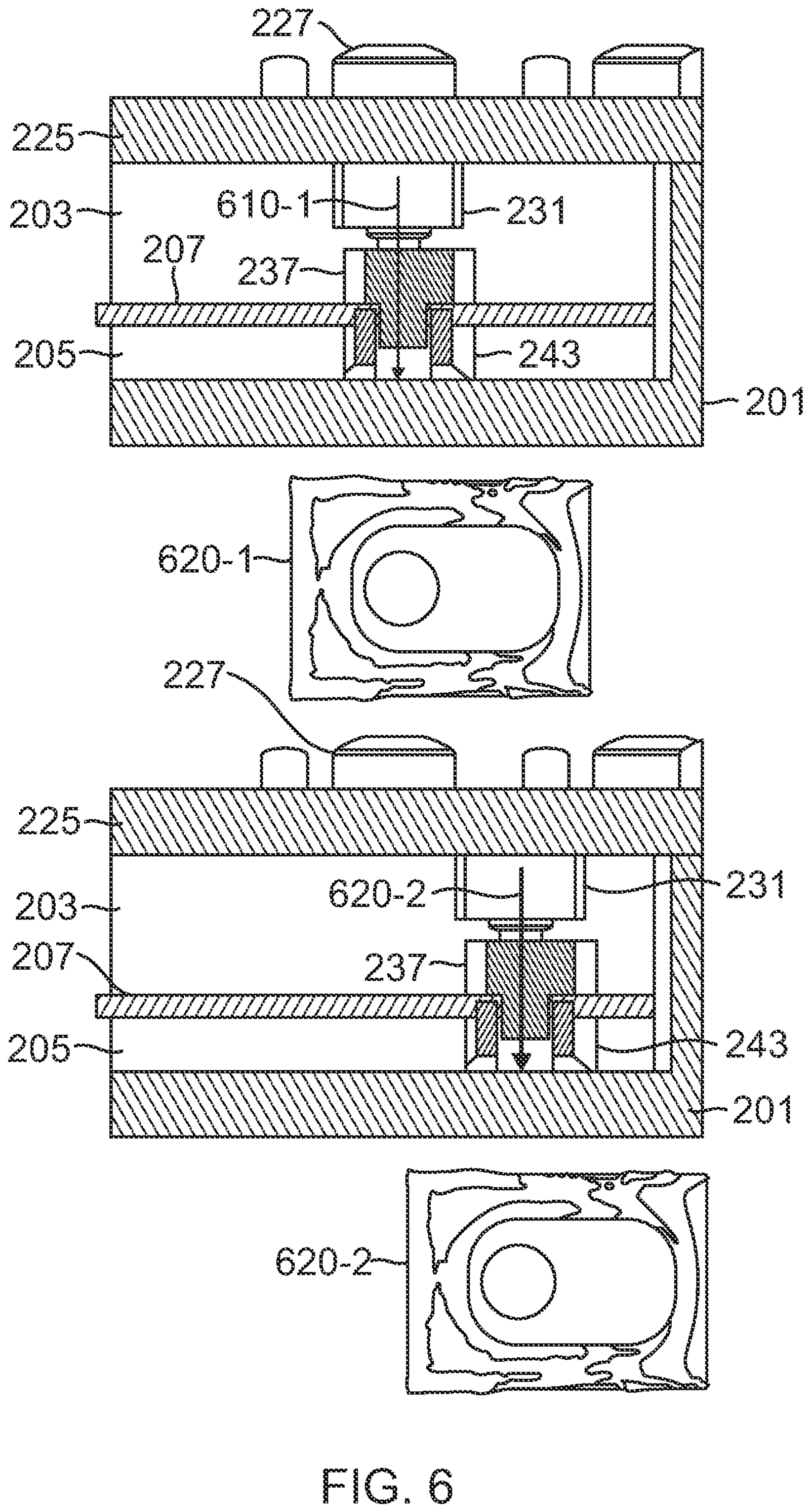
FIG. 6 is a diagram illustrating the installation of the components of a PIM robust short circuit design at different locations within a groove according to an aspect of the present disclosure.

FIG. 6 is a diagram illustrating the installation of the pressure application component 231, phasing line securing component 237, and shorting component 243 at different locations 610 along the phasing line 207 and the associated pressure diagrams 620 for the shorting component 243 at different locations 610 along the phasing line 207. As illustrated, the components may be secured at positions 610-1 and 610-2. As the relationship of the different components to each other remains constant, the phasing line 207, and other components of the conductive body 201 and cover 225, the pressures experienced by the different components may be consistent at different positions. For example, the pressure diagram 620-1 is associated with the position 610-1 along the phasing line 207, and the pressure diagram 620-2 is associated with the position 610-2 along the phasing line 207. As shown, the pressure diagrams 620-1 and 620-2 show that the experienced pressure is substantially the same at the positions 610-1 and 610-2. Also, the pressure is applied uniformly across the front face of the shorting component 243. Due to the uniformity and consistency of the pressure, the components can be more easily positioned to impedance match a duplexer or filter in its passband(s) and reduce the incidence of PIM.

EXAMPLE EMBODIMENTS

Example 1 includes a system comprising: a phasing line within a groove; a shorting component having a mating surface that couples to a first surface of the phasing line and a surface opposite the mating surface that couples to a first interior surface of the groove; a securing component configured to couple to a second surface of the phasing line, wherein the second surface is opposite the first surface; and a pressure application component configured to apply pressure against a second interior surface of the groove opposite the first interior surface and against the securing component, the pressure being applied in opposite directions, wherein the pressure applied to the securing component causes the securing component to press the phasing line into the mating surface of the shorting component, and the shorting component to press against the first interior surface of the groove.

Example 2 includes the system of Example 1, wherein the phasing line is a flattened phasing line.

Example 3 includes the system of any of Examples 1-2, further comprising alignment structures that align the securing component with the shorting component.

Example 4 includes the system of Example 3, wherein one of the shorting component and the securing component has at least one notch and one of the shorting component and the securing component has at least one slot, wherein the alignment structures comprise the at least one notch and the at least one slot, where the at least one notch extends around the phasing line into the at least one notch.

Example 5 includes the system of any of Examples 1-4, wherein the pressure application component comprises: a through-hole; and a moveable mechanism extending through the through-hole, wherein the moveable mechanism can be adjusted to move in and out of the through-hole, wherein the moveable mechanism comprises a pressure application surface configured to press against the securing component.

Example 6 includes the system of Example 5, wherein the moveable mechanism further comprises an alignment pin extending from the pressure application surface, wherein the alignment pin extends into an alignment hole in the securing component.

Example 7 includes the system of any of Examples 5-6, wherein the groove is formed within a conductive body having a cover mounted thereon, and the moveable mechanism is accessible through a slot in the cover.

Example 8 includes the system of any of Examples 1-7, wherein the shorting component further comprises; a first gap formed in the mating surface, such that only an outer ridge of the mating surface contacts the phasing line that couples to the first surface of the phasing line; and a second gap formed in the surface opposite the mating surface that couples to the first interior surface of the groove.

Example 9 includes a system comprising: a conductive body having a groove formed therein; a cover mounted to the conductive body, the groove being enclosed between the conductive body and the cover; a phasing line mounted within the groove; a shorting component mounted between the phasing line and a surface of the groove opposite the cover; a securing component, wherein the phasing line extends between the securing component and the shorting component; and a pressure application component abutted against an interior surface of the cover, wherein the pressure application component is configured to apply pressure to the securing component, wherein application of the pressure causes the phasing line to be pressed between the shorting component and the securing component and a location of the shorting component and the securing component to be secured within the groove.

Example 10 includes the system of Example 9, wherein the phasing line is a flattened phasing line.

Example 11 includes the system of any of Examples 9-10, further comprising alignment structures that align the securing component with the shorting component.

Example 12 includes the system of Example 11, wherein one of the shorting component and the securing component has at least one notch and one of the shorting component and the securing component has at least one slot, wherein the alignment structures comprise the at least one notch and the at least one slot, where the at least one notch extends around the phasing line into the at least one notch.

Example 13 includes the system of any of Examples 9-12, wherein the pressure application component comprises: a through-hole; and a moveable mechanism extending through the through-hole, wherein the moveable mechanism can be adjusted to a position in relation to the cover, wherein the pressure application component applies the pressure to the securing component through a pressure application surface on the moveable mechanism.

Example 14 includes the system of Example 13, wherein the moveable mechanism further comprises an alignment pin extending from the pressure application surface, wherein the alignment pin extends into an alignment hole in the securing component.

Example 15 includes the system of any of Examples 13-14, wherein the moveable mechanism is accessible through a slot in the cover.

Example 16 includes the system of any of Examples 9-15, wherein the shorting component further comprises; a first gap formed in a mating surface on the shorting component in contact with the phasing line, such that only an outer ridge of the mating surface contacts the phasing line that couples to a first surface of the phasing line; and a second gap formed in a surface of the shorting component opposite the mating surface that couples to a first interior surface of the groove.

Example 17 includes an apparatus comprising: a pressure application component having a through-hole and a moveable mechanism extending through the through-hole, the moveable mechanism having a pressure application surface, wherein the pressure application component abuts against an interior surface of groove; a securing component, wherein the pressure application surface couples to the securing component; and a shorting component, wherein a phasing line extends between the securing component and the shorting component and the pressure applied to the securing component by the pressure application surface secures a position of the securing component and the shorting component within the groove.

Example 18 includes the apparatus of Example 17, wherein the groove is enclosed within a conductive body coupled to a cover and the moveable mechanism is accessible through a slot in the cover.

Example 19 includes the apparatus of any of Examples 17-18, wherein one or more alignment structures align the pressure application component, the securing component, and the shorting component with respect to each other within the groove.

Example 20 includes the apparatus of any of Examples 17-19, wherein the shorting component and the securing component secure a flattened phasing line between the securing component and the shorting component.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:

a phasing line within a groove;

a shorting component having a mating surface that couples to a first surface of the phasing line and a surface opposite the mating surface that couples to a first interior surface of the groove;

a securing component configured to couple to a second surface of the phasing line, wherein the second surface is opposite the first surface; and a pressure application component configured to apply pressure against a second interior surface of the groove opposite the first interior surface and against the securing component, the pressure being applied in opposite directions, wherein the pressure applied to the securing component causes the securing component to press the phasing line into the mating surface of the shorting component, and the shorting component to press against the first interior surface of the groove.

2. The system of claim 1, wherein the phasing line is a flattened phasing line.

3. The system of claim 1, further comprising alignment structures that align the securing component with the shorting component.

4. The system of claim 3, wherein one of the shorting component and the securing component has at least one notch and one of the shorting component and the securing component has at least one slot, wherein the alignment structures comprise the at least one notch and the at least one slot, where the at least one notch extends around the phasing line into the at least one notch.

5. The system of claim 1, wherein the pressure application component comprises:

a through-hole; and a moveable mechanism extending through the through-hole, wherein the moveable mechanism can be adjusted to move in and out of the through-hole, wherein the moveable mechanism comprises a pressure application surface configured to press against the securing component.

6. The system of claim 5, wherein the moveable mechanism further comprises an alignment pin extending from the pressure application surface, wherein the alignment pin extends into an alignment hole in the securing component.

7. The system of claim 5, wherein the groove is formed within a conductive body having a cover mounted thereon, and the moveable mechanism is accessible through a slot in the cover.

8. The system of claim 1, wherein the shorting component further comprises;

a first gap formed in the mating surface, such that only an outer ridge of the mating surface contacts the phasing line that couples to the first surface of the phasing line; and a second gap formed in the surface opposite the mating surface that couples to the first interior surface of the groove.

9. A system comprising:

a conductive body having a groove formed therein;

a cover mounted to the conductive body, the groove being enclosed between the conductive body and the cover;

a phasing line mounted within the groove;

a shorting component mounted between the phasing line and a surface of the groove opposite the cover;

a securing component, wherein the phasing line extends between the securing component and the shorting component; and a pressure application component abutted against an interior surface of the cover, wherein the pressure application component is configured to apply pressure to the securing component, wherein application of the pressure causes the phasing line to be pressed between the shorting component and the securing component and a location of the shorting component and the securing component to be secured within the groove.

10. The system of claim 9, wherein the phasing line is a flattened phasing line.

11. The system of claim 9, further comprising alignment structures that align the securing component with the shorting component.

12. The system of claim 11, wherein one of the shorting component and the securing component has at least one notch and one of the shorting component and the securing component has at least one slot, wherein the alignment structures comprise the at least one notch and the at least one slot, where the at least one notch extends around the phasing line into the at least one notch.

13. The system of claim 9, wherein the pressure application component comprises:

a through-hole; and a moveable mechanism extending through the through-hole, wherein the moveable mechanism can be adjusted to a position in relation to the cover, wherein the pressure application component applies the pressure to the securing component through a pressure application surface on the moveable mechanism.

14. The system of claim 13, wherein the moveable mechanism further comprises an alignment pin extending from the pressure application surface, wherein the alignment pin extends into an alignment hole in the securing component.

15. The system of claim 13, wherein the moveable mechanism is accessible through a slot in the cover.

16. The system of claim 9, wherein the shorting component further comprises;

a first gap formed in a mating surface on the shorting component in contact with the phasing line, such that only an outer ridge of the mating surface contacts the phasing line that couples to a first surface of the phasing line; and a second gap formed in a surface of the shorting component opposite the mating surface that couples to a first interior surface of the groove.

17. An apparatus comprising:

a pressure application component having a through-hole and a moveable mechanism extending through the through-hole, the moveable mechanism having a pressure application surface, wherein the pressure application component abuts against an interior surface of groove;

a securing component, wherein the pressure application surface couples to the securing component; and a shorting component, wherein a phasing line extends between the securing component and the shorting component and the pressure applied to the securing component by the pressure application surface secures a position of the securing component and the shorting component within the groove.

18. The apparatus of claim 17, wherein the groove is enclosed within a conductive body coupled to a cover and the moveable mechanism is accessible through a slot in the cover.

19. The apparatus of claim 17, wherein one or more alignment structures align the pressure application component, the securing component, and the shorting component with respect to each other within the groove.

20. The apparatus of claim 17, wherein the shorting component and the securing component secure a flattened phasing line between the securing component and the shorting component.

* * * * *